United States Patent [19]
Ackeret

[11] 3,894,591
[45] July 15, 1975

[54] BALANCES PARTICULARLY FOR KITCHEN USE

[75] Inventor: Peter Ackeret, Zurich, Switzerland

[73] Assignee: Salter Housewares Limited, West Bromwich, England

[22] Filed: Jan. 22, 1973

[21] Appl. No.: 325,782

[30] Foreign Application Priority Data
Jan. 23, 1972 Switzerland............................ 875/72
Jan. 23, 1972 Switzerland............................ 966/72

[52] U.S. Cl............... 177/126; 177/173; 177/229; 177/245
[51] Int. Cl............................................ G01g 21/00
[58] Field of Search............ 177/124, 126, 180-182, 177/168-175, 225, 230-234, 238-243, 177/245, 256

[56] References Cited
UNITED STATES PATENTS

| | | | |
|---|---|---|---|
| 1,587,904 | 6/1926 | Duncan............................ | 177/233 |
| 1,880,398 | 10/1932 | Bennet............................ | 177/175 X |
| 2,061,278 | 11/1936 | Kircher........................... | 177/234 X |
| 2,078,812 | 4/1931 | Rudiger........................... | 177/239 |
| 2,633,018 | 3/1953 | McIlvaine........................ | 177/234 |
| 2,649,294 | 8/1953 | Walter............................. | 177/229 |
| 2,821,376 | 1/1958 | Aston.............................. | 177/173 |
| 2,936,163 | 5/1960 | Foster............................. | 177/124 |
| 3,167,144 | 1/1965 | Jacobs et al..................... | 177/225 |
| 3,193,034 | 7/1965 | Hutchinson et al.............. | 177/225 |
| 3,229,780 | 1/1966 | Hanssen.......................... | 177/233 |
| 3,321,036 | 5/1967 | Keenan et al.................... | 177/245 |
| 3,584,696 | 6/1971 | Eblowitz......................... | 177/169 |
| 3,592,277 | 7/1971 | Ackert............................ | 177/126 |

FOREIGN PATENTS OR APPLICATIONS

| | | | |
|---|---|---|---|
| 929,664 | 1/1948 | France........................... | 177/239 |
| 1,048,033 | 12/1958 | Germany......................... | 177/243 |

Primary Examiner—Richard B. Wilkinson
Assistant Examiner—Vit W. Miska
Attorney, Agent, or Firm—Markva & Smith

[57] ABSTRACT

A kitchen balance includes a spring weighing device with a base structure and a vertically movable platform in combination with at least one cup shaped container suitable for use as a mixing bowl. The container can be inverted so as to rest upon a seating formed by the base structure and thereby substantially to cover the weighing device, the container when inverted being located by a part of the weighing device which fits inside the container thereby to prevent dislodgement off said seating. Grip portions are also advantageously provided to facilitate clamping of the inverted container to the base structure when the balance is transported by hand. The base structure encloses weight indicating means comprising a pivoted pointer and a rotatably movable scale carrier carrying at least one graduated scale visible through an elongate viewing window in the base structure. The scale carrier has grip means to permit manual manipulation and adjustment to set the graduated scale in different positions along the path of movement of the pointer so as to facilitate zeroing and weight measurement of successively added loads.

15 Claims, 7 Drawing Figures

BALANCES PARTICULARLY FOR KITCHEN USE

BACKGROUND OF THE INVENTION

The present invention relates to a balance, particularly for kitchen use, and it has as an object the provision of a kitchen balance having various improved and useful novel features and combinations thereof as will become apparent from the subsequent description.

SUMMARY OF THE INVENTION

In one aspect, a balance, particularly for kitchen use, constructed in accordance with the invention comprises a cup shaped weighing container in combination with a spring weighing device which includes a base structure and a vertically movable weighing platform, said weighing platform being adapted in use to support said weighing container in an upright condition, wherein the weighing container can be inverted and placed, when not in use, in an inverted condition over the weighing platform so as substantially to cover the weighing device in which inverted condition the container is supported in stable relationship by a rim portion which rests upon a seating surface formed by said base structure and is located by a part of the weighing device, said part restricting lateral displacement of the inverted container sufficiently to prevent dislodgement off said seating.

According to another aspect, a balance, especially for kitchen use, in accordance with the invention has weight indicator means comprising a movably mounted scale carrier carrying a graduated scale with equally spaced divisions and an associated complementary movable pointer operatively controlled by weight sensing means of the balance, and said weight indicator means is disposed behind a cover or casing portion having an elongate viewing window which enables the pointer and graduated scale to be viewed throughout the full operational range of movement of said pointer, the movably mounted scale carrier being adapted to be manually manipulated and adjusted so as to set said graduated scale in different positions along the path of movement of the pointer thereby to facilitate zeroing and weight measurement of successively added loads.

In preferred embodiments of the invention, the range of movement of such adjustable scale carrier is at least as great as the length, from end to end, of the graduated scale, and also, the scale carrier includes a digitally -engageable grip or handle portion which projects externally of the cover or casing to facilitate the manual manipulation of the scale carrier.

Perferably, the above-mentioned cut shaped container has a substantial depth in relation to the diameter of its base and is designed so as to be especially suitable for use not only as a weighing receptacle but also for use as a mixing bowl for general food preparation work. Furthermore, is preferred embodiments, the balance is designed so that the rim portion of the container, when resting on said seating with the container in its inverted condition, together with an underlying portion of the base structure provide gripping surfaces or parts embraceable by a finger and thumb of a normal adult human hand to hold said inverted container upon the seating of the base structure in clamped relationship. Thus, not only can the container, when not in use, be inverted to form a dust proof and mechanical protective cover, but the balance with the container inverted also forms a compact, easily transportable unit as will be apparent from a more detailed description of a specific embodiment herein after set forth.

Also, in preferred embodiments the part of the weighing device which locates the container in the inverted condition is conveniently provided by the weighing platform which may be designed to fit inside the inverted container in close spaced relationship with the interior wall surface of the body of the container. Additional containers of identical form can also be provided and they may advantageously be designed to nest together in close fitting relationship in contact with one another only around their rim portions.

BRIEF DESCRIPTION OF DRAWING

By way of example, one form of kitchen balance constructed in accordance with the invention is illustrated in the accompanying drawings. In said drawings.

DESCRIPTION OF SPECIFIC EMBODIMENTS

Figure 1:
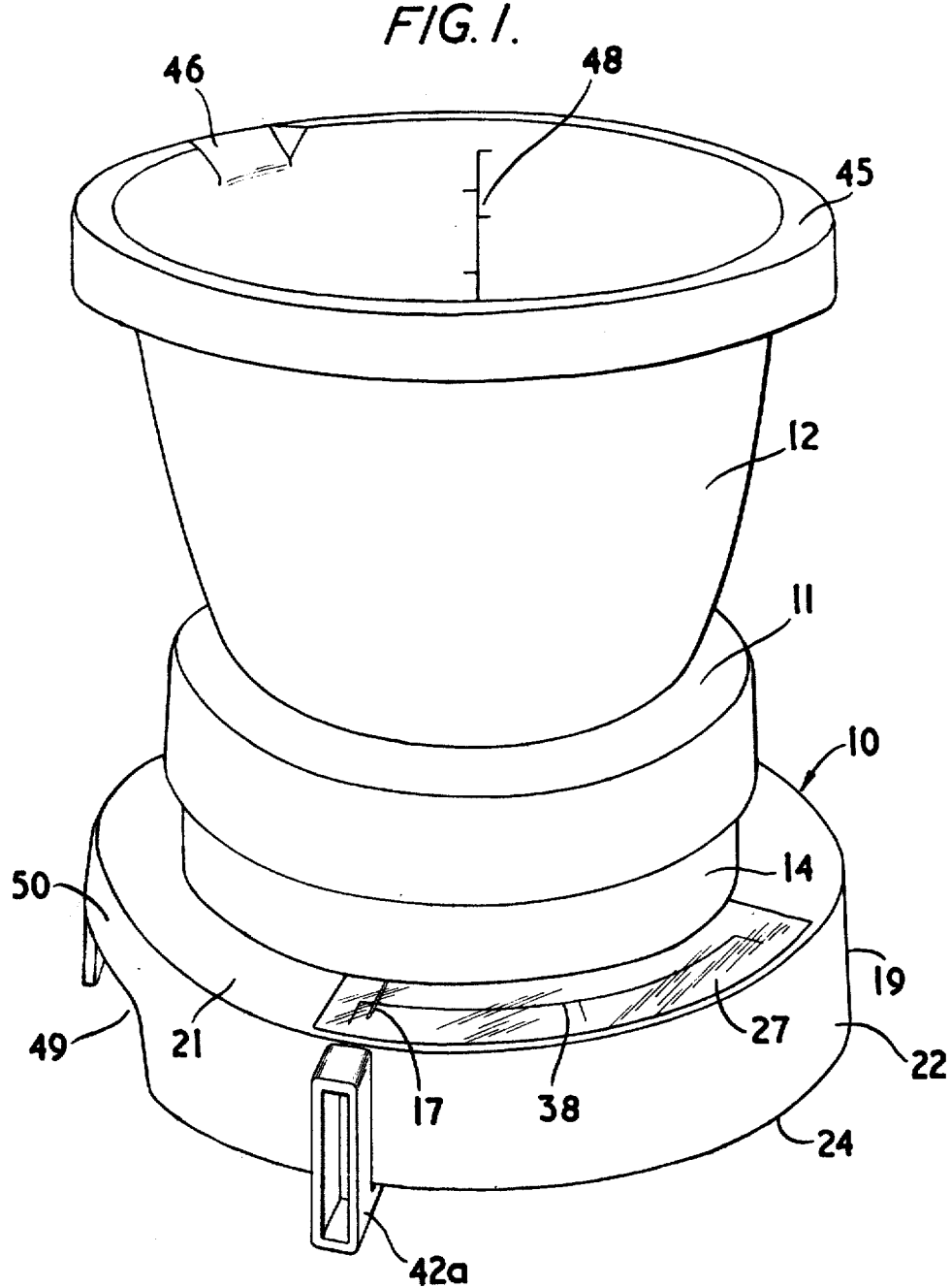
FIG. 1 is a general perspective view of the balance with a weighing container thereof supported on a weighing platform of the weighing device.
Figure 2:
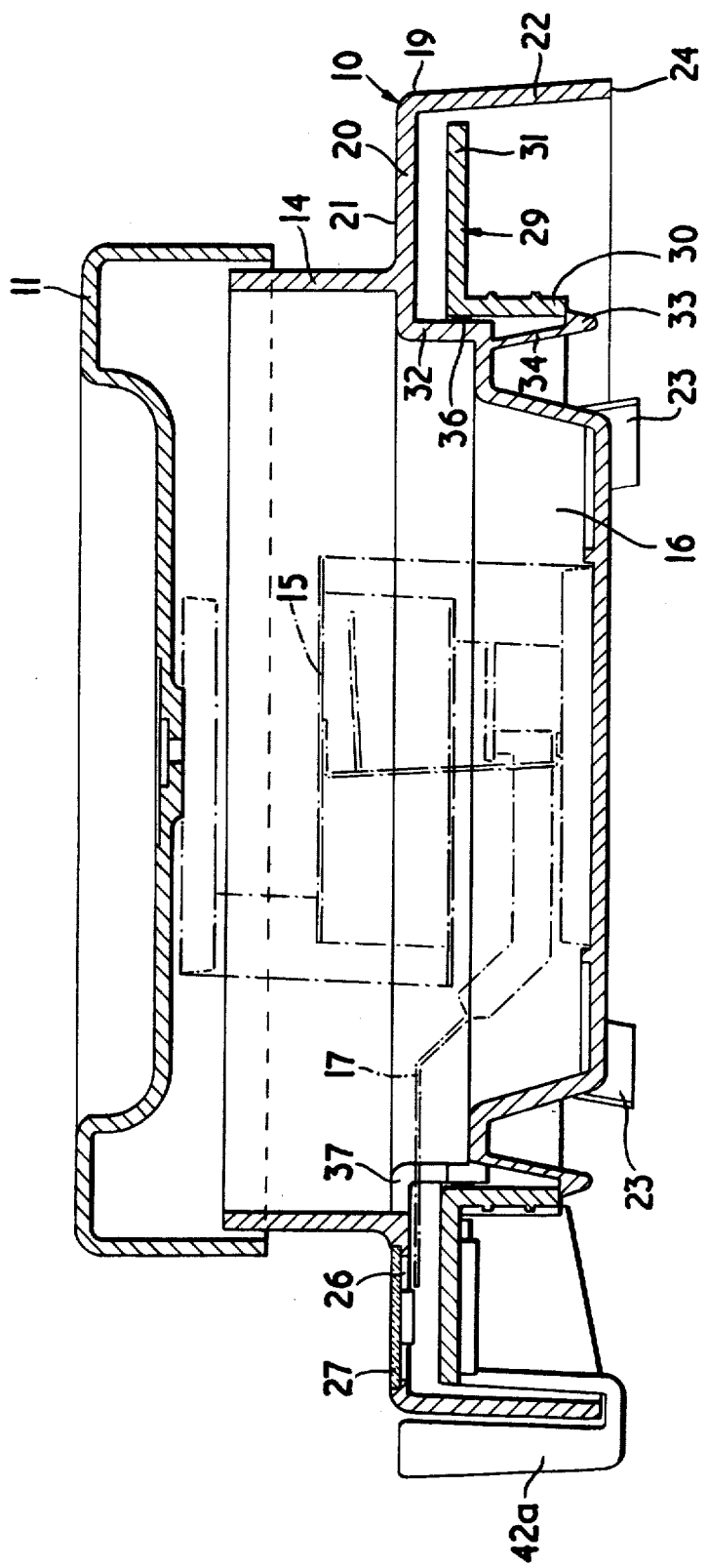
FIG. 2 is a vertical cross-section, on a larger scale, through the weighing device.

The balance illustrated in FIGS. 1 to 5 comprises a base structure 10 and a vertically movable weighing platform 11 adapted to support one or more deep cup shaped weighing containers 12.

The weighing platform 11 is telescopically movable in relation to a central cylindrical upstanding portion 14 of the base structure 10 and is supported by a parallel leaf spring mechanism 15 constituting weight sensing means seated in a well or central cavity 16 of said base structure which forms a housing or casing.

The spring mechanism 15 operatively controls a pointer 17 pivotally mounted about a central vertical axis such that the pointer is deflected angularly substantially in linear proportional relationship with the magnitude of the load applied to the weighing platform.

The base structure 10 is composed of moulded opaque plastics material and has, below the upstanding portion 14, a plinth like part 19 comprising an annular portion 20 extending radially outwards which provides a flat horizontal upper surface 21 forming a circular shelf or ledge, and a peripheral depending skirt 22. The base structure is supported by a plurality of short feet 23 so that the lower edge 24 of skirt portion 22 will normally be disposed in slightly spaced relationship above an underlying supporting surface.

Formed in the annular portion 20 is an arcuate slot 26 fitted with a transparent cover forming an elongate viewing window 27.

Within the plinth like part 19 is a rotatably mounted scale carrier member 29 which comprises a cylindrical hub portion 30 and a flat ring or annular plate portion 31 underlying the annular portion 20 of the plinth like part 19.

The scale carrier member 29 is co-axial with the pivot mounting of the pointer 17 and is mounted for rotation about the central vertical axis by means of its hub portion 30 which fits with working clearance around a cylindrical upper wall 32 of the central body of the base structure hub portion 30 rests upon shouldered lower ends 33 of a plurality of integrally formed resilient retaining clips 35 depending from said body of the base structure. The scale carrier member 29 is fitted in place or is removed by flexing these retaining clips 35 inwards. The wall 32 may also carry a number of bearing pads, of felt for example, such as indicated at 36, which take up clearance between the hub portion 30 and said wall 32 and provide a certain degree of desirable friction resistance to rotary movement of the scale carrier member.

The pointer 17 passes through an aperture 37 in the body wall 32 and overlies the flat ring or annular plate portion 31 of the scale carrier member 29.

On its upper surface, this scale carrier portion 31 carries a graduated scale 38 having equally spaced divisions marked, in this example, in grammes and kilogrammes. The graduated scale 38 follows a circular arc, again centred upon the pivotal axis of the pointer, extending through an angle $\alpha$ (see FIG. 5) which is slightly less than the angular extent of the viewing window 27 and which corresponds substantially to the angular deflection of the pointer at full load. The end 39 of the window 27 coincides substantially with the position of full scale deflection of the pointer 17 corresponding to maximum loading and a stop may be provided at this position to limit excess movement of said pointer.

Figure 5:
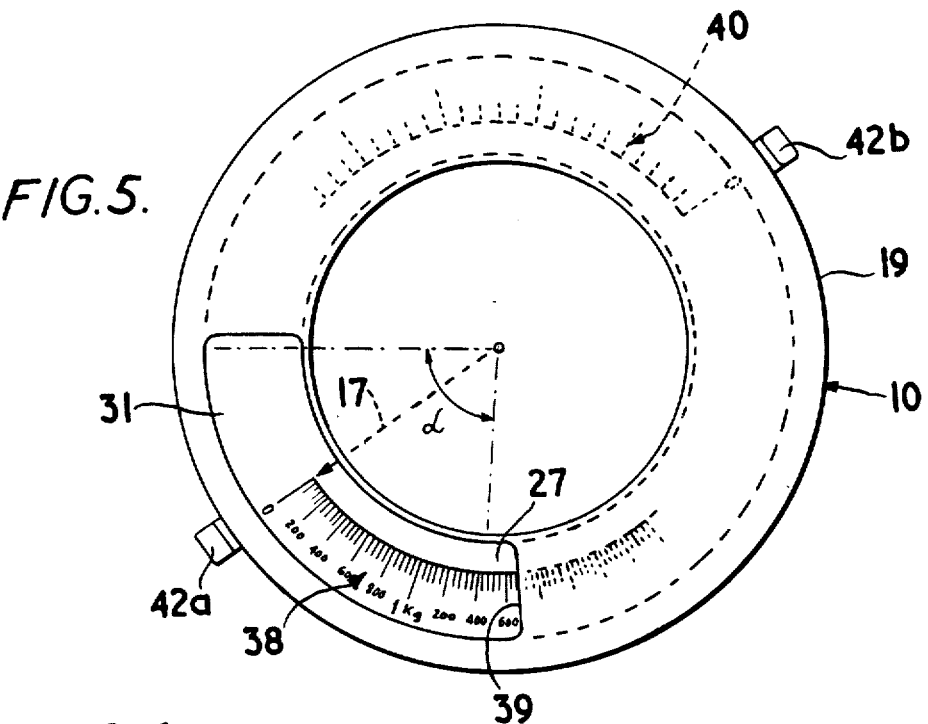
FIG. 5 is a diagrammatic plan view of the weighing device showing the scale arrangement.

The scale carrier portion 31, in this particular example, also carries a separate second graduated scale 40 of similar form in angularly spaced relationship with scale 38, as indicated in FIG. 5. The divisions of this second scale 40 are conveniently marked in different units of weight measurement such as, for example, avoirdupois.

Both scales 38 and 40 cover substantially the same weighing range so that if scale 38 is calibrated from, say, 0 to 2.2 kg., scale 40 would be calibrated from 0 to 4.5 lbs.

As shown, the rim portion 45 of each container 12 has a deep turned over flange providing a U-shaped channel section profile, and the outer diameter D is substantially equal to the diameter of the plinth like part 19 of the base structure.

Each weighing container 12 is also formed with a spout 46 formed by a recess inset in its rim portion 45 so that there are no projecting portions, and a volumetric measuring scale 48 may usefully be provided upon the interior wall surface, as indicated in FIG. 1.

Figure 4:
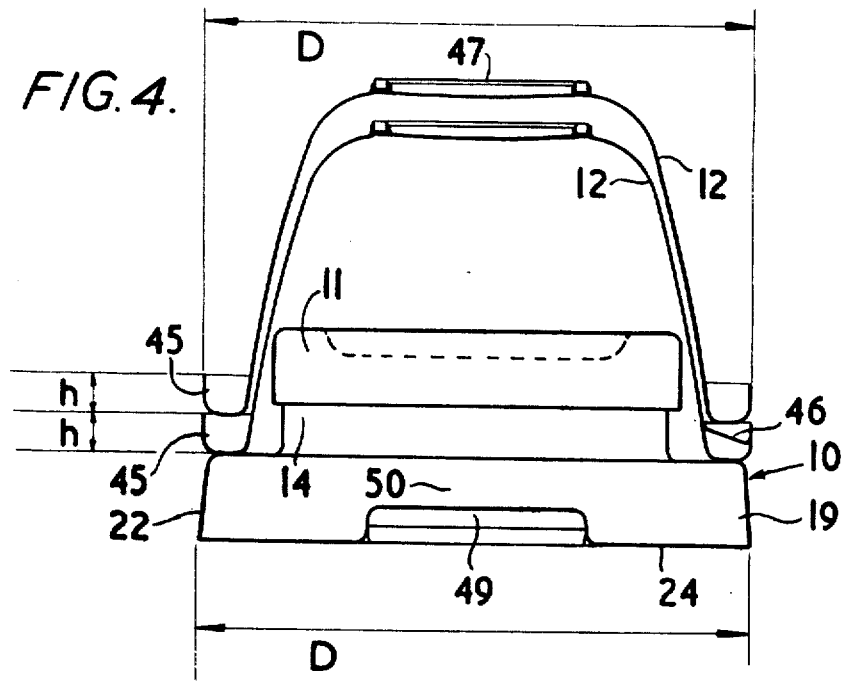
FIG. 4 is an elevational view of the weighing device with a pair of identical weighing containers, as in FIG. 3, shown in section in their inverted, nested, condition.

In use, each container 12 will normally be seated in an upright condition upon the weighing platform 11, but when not in use it can be inverted and placed over the weighing platform so as substantially to cover the weighing device and it is then supported in stable relationship by its rim portion 45 which rests upon the upper seating surface 21 of the base structure plinth like part 19, said surface forming a seating as illustrated in FIG. 4. In this condition, the weighing platform 11 fits inside the inverted container 12 in close spaced relationship with the interior wall surface of the latter and effectively locates the container centrally and prevents any lateral displacement sufficient to dislodge it off the seating provided by seating surface 21.

Since food preparation in making up recipes sometimes requires that several ingredients be weighed out separately, the provision of several of the weighing containers 12 is an advantage, and as they can be stacked and nested together in close fitting relationship as will be clear from the drawings, very little extra space is taken up, especially when they are all in their inverted out-of-use condition.

The different containers 12 are all identical and of the same weight so that they can be used interchangeably and as indicated in FIG. 4, when nested together, they contact one another only around their rim portions 45 as a result of the shape and depth $h$ of the flange of the latter so that there is no tendency for individual containers to jam in a stacked assembly.

Each container 12 is also provided upon its base or bottom with a rubber ring 47 so that its stability when upright and its non-slipping capacity is improved.

The skirt portion 22 of the base structure 10 is further formed with a pair of diametrically opposite apertures 49, 49, which provide residual depending flange portions 50 along their upper boundary edges.

Figure 3:
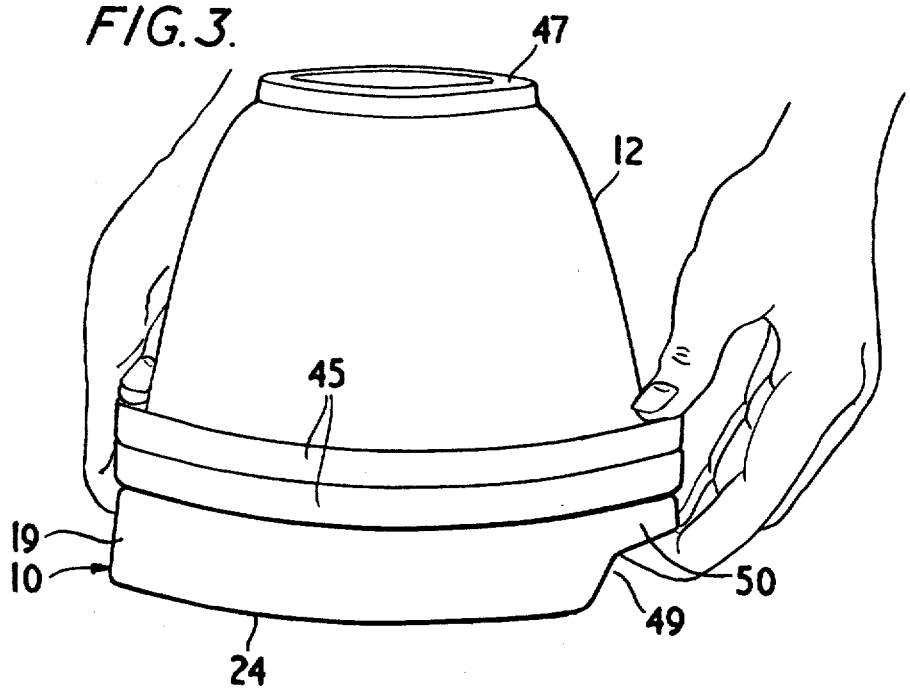
FIG. 3 is a perspective view of the weighing device with a pair of identical weighing containers shown in inverted condition and resting on a seating of the weighing device, and the manner in which the balance can then be handled as a compact easily transportable unit is indicated.

When the containers 12 are inverted, these flange portions 50 and the flange formed by the outer wall of the rim portion 45 of the top container provided gripping surfaces which can be embraced with hooking engagement by a finger and thumb of a normal adult human hand, as shown in FIG. 3, so that the container or containers can be held upon the seating surface 21 in clamped relationship, thereby enabling the balance to be easily and securely transported as a compact unit.

The containers 12, being of substantial depth, are well suited to the mixing of ingredients therein by stirring or kneading, as with a food mixer for example, and when several identical bowls are in use, the equality in weight avoids the need for repeated taring of the balance for the ingredients weighed out in each.

The rotatable mounting of the scale carrier member 29 enables it to be adjusted so as selectively to bring either of the two scales 38 and 40 beneath the viewing window 27 and each scale, when in use, can be set in different positions along the path of movement of the pointer to facilitate zeroing or taring and weight measurement of successively added loads using a single container as hereinafter described.

To facilitate manual manipulation to carry out the adjustments referred to above, the scale carrier member 29 has a pair of digitally-engageable grip or handle portions 42a, 42b which project laterally, outside the plinth like portion 19. Each grip or handle portion 42a or 42b is fitted into a slot on the underside of the scale carrier portion 31 and has a U-shaped body which extends beneath the lower edge 24 of the skirt 22. Conveniently, grip or handle portion 42a lies in substantially radical alignment with a zero division of scale 38 and grip or handle portion 42b lies in substantially radial alignment with the zero division of scale 40.

In use, taring or adjustment of the pointer 17 to the zero mark of the scale selected is extremely simple irrespective of whether or not the weighing is being carried out with a given weighing container on the weighing platform. Thus, if it is desired to use the scale 38, the scale carrier member 29 is rotated with the aid of the grip or handle portion 42a until the pointer 17 is over the zero mark of this scale, and then the desired amount of material can be weighed out.

When, as in following certain recipes for example, it is necessary to add successively different ingredients in varying amounts into the same vessel, it is advantageous to be able readily to carry out an additive weighing operation. This is quite straight forward with the present balance using a single weighing container of the form shown at 12 which is well suited to holding a reasonable quantity of different ingredients which may also be mixed therein as previously mentioned. After weighing out the first ingredient as described above, it is only necessary to adjust the scale carrier member to again bring the zero mark of scale 38 under the pointer 17 and the next ingredient can then be added and weighed by taking a direct reading, thereby avoiding the need for any calculation of additional weight.

The fact that the arcuate length of the viewing window 27 corresponds substantially to the full scale deflection of the pointer 17 and that the viewing window 27 terminates close to the position of maximum operational displacement of the pointer has the advantage that in additive weighing, the length of the scale which is visible after re-setting to zero automatically indicates how much weighing capacity is still available. The part of the scale representing the weighing range which is no longer available after re-setting during such additive weighing operations disappears beyond the end 39 of the viewing window 27 and is no longer visible. Thus, in the example represented in FIG. 5, the position of the scale 38, zeroed against the pointer 17, indicates that there is still a usable weighing capacity of approximately 1 kilo 600 grams.

The other scale 40 is similarly brought into use when required by rotating the scale carrier through a sufficiently large angle to bring it below the window 27, the scale then being zeroed against the pointer, using most conveniently the grip or handle portion 42b.

The large angular separation of the two scales 38 and 40 is advantageous in ensuring that only one scale at a time will be visible through the viewing window. However, with a viewing window extending through an angle of approximately 90° as shown in FIG. 5, up to four different separate graduated scales could be accommodated around the scale carrier plate or ring portion 31 if required.

With a plurality of separate graduated scales, as described, each is advantageously provided with a background of a different distinctive colour so that they can quickly be differentiated or distinguished when in use. The provision of a grip or handle portion for each scale, aligned with a zero marking of each, is also a useful feature but is not essential.

If only one graduated scale is provided, the scale carrier member need not rotate through an angle greater than the angular extent of the viewing window, and the maximum displacement may be limited by stops.

Figure 6:
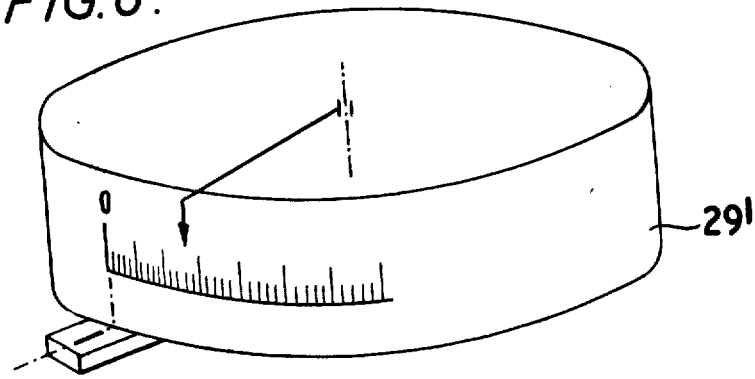
FIG. 6 shows diagrammatically, in perspective, a modified cylindrical form of scale carrier.
Figure 7:
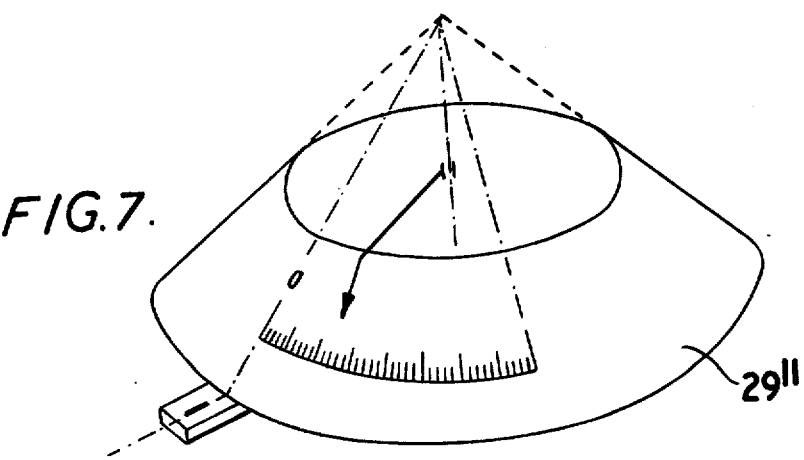
FIG. 7 shows similarly a modified truncated conical form of scale carrier.

As an alternative to the flat ring or annular plate form already described, the scale carrier may take other forms if modifications are made to the design of the structure of the balance as will be obvious to persons skilled in the art. Thus, the base structure, together with the viewing window, could readily be designed to accommodate a scale carrier in the form of a hollow cylinder with the graduated scale markings extending axially as a series of parallel lines presented upon the exterior surface as illustrated diagrammatically at 29' in FIG. 6; or the scale carrier may be of a truncated or frusto-conical form with the scale markings directed towards the apex as illustrated diagrammatically at 29'' in FIG. 7. Alternatively, the scale carrier may be in the form of a flat circular disc with the graduated scale markings directed towards the center.

It will be appreciated that numerous other modifications may be readily made within the scope of the invention as set forth in the appended claims.

I claim:

1. In combination with a balance including a spring weighing device having a base structure and a vertically movable weighing platform, the invention which comprises:
   a. a cup-shaped weighing container (12) having a bottom wall, side wall means diverging from said bottom wall, and an external rim portion bounding the open mouth of said side wall means;
   b. said base structure including
      1. a central upstanding portion (14);
      2. a horizontal annular shelf portion (20) extending radially outwardly from said upstanding portion; and
      3. an annular downwardly depending skirt portion (22) connected with the outer peripheral edge of said horizontal shelf portion, said skirt portion containing at its lower extremity a pair of apertures (49) that define finger gripping means;
   c. said weighing container having a structural configuration which fits over the weighing platform when said container is inverted to substantially cover the weighing device and is seated in stable relationship with said rim portion supported on the seating surface of said shelf portion without load on the weighing platform;
   d. the clearance between said weighing platform and the side walls of the inverted weighing container being such as to restrict lateral displacement of said container sufficiently to prevent dislodgement thereof from said seating surface whereby when the user's fingers of each hand are inserted within said apertures, respectively, the upper surface of said rim portion may be gripped by the user's thumbs to maintain the weighing container and base together as a unit during transport.

2. The combination as defined in claim 1 wherein said spring weighing device has a pointer and said base structure includes a graduated scale weight indicating means,
said flat annular shelf portion of the base structure has a window aperture through which said indicating means are visible when the balance is in use.

3. The combination as defined in claim 1 wherein said base structure includes a scale weight indicating means having graduated scale markings and a rotatably mounted scale carrier,
said scale carrier bearing said scale markings,
said flat annular shelf portion of the base structure has a window aperture through which said scale markings are visible when the balance is in use,
said scale carrier being adjustable so as to selectively position said scale markings beneath the window aperture in different relative positions to the pointer of said weighing device thereby to facilitate zeroing and the weight measurement of successively added loads.

4. The combination as defined in claim 1 wherein there is a plurality of said cup-shaped weighing containers which are capable of nesting together in close fitting relationship with only the rim portions in contact with one another and a clearance space between their side walls.

5. In a balance including a weight indicator means having a graduated scale, a complementary movable pointer which cooperates with said scale, and a weight sensing means which operatively controls said pointer, the combination comprising:
 a. a housing enclosing said weight indicator means and said weight sensing means, said housing including a cylindrical central portion;
 b. an elongated viewing window located in said housing to permit the pointer and the graduated scale to be viewed throughout the full operational range of movement of said pointer;
 c. said weight indicator means including a rotatable carrier on which said graduated scale is disposed, said carrier having a hub portion arranged concentrically about the central portion of said housing;
 d. resilient clip means supporting said scale carrier by the lower edge of said hub portion for rotation about said central portion and the central axis of the housing; and
 e. setting means for manually manipulating and adjusting said scale carrier relative to said housing so as to set said graduated scale in different positions along the path of movement of said pointer, thereby to facilitate zeroing and weight measurement of successively added loads, said scale carrier having a range of movement which is at least as great as the length, from end to end, of the graduated scale.

6. The combination as defined in claim 5 wherein said weight indicator means includes two separate graduated scales disposed on the scale carrier, said two scales being in spaced relationship with respect to each other and being calibrated in different units of weight,
said scales being located on the scale carrier so that each can selectively be brought in to use behind the viewing window by appropriate adjustment of the scale carrier.

7. The combination as defined in claim 5 wherein said balance includes a vertically movable weighing platform and at least one cup-shaped weighing container to serve as a food mixing bowl and weighing receptacle.

8. The combination as defined in claim 5 wherein said pointer pivots about an axis common to the central axis of the housing and
the graduated scale extends through an arc centered upon said central axis.

9. The combination as defined in claim 5 wherein the scale carrier comprises a flat ring member with the graduated scale markings directed toward the central axis thereof.

10. In a balance having a predetermined operational range of measurement and including a weight indicator means having a graduated scale, a complementary movable pointer which cooperates with said scale and a weight sensing means responsive to a load placed on the balance and which operatively controls said pointer to move from an intitial zero pointer position to a full-load pointer position throughout an operational range of movement for indicating the weight of an article placed on the balance, the combination comprising:
 a. a housing enclosing said weight indicator means and said weight sensing means,
 b. said graduated scale including a zero marking and a full-load marking spaced from the zero marking to define a maximum weighing measurement range and length of said scale,
 c. an elongated viewing window located in said housing to permit the pointer and the graduated scale to be viewed throughout the full operational range of movement of said pointer,
 d. said window having first and second boundary edges spaced apart by a distance at least as great as the length of the graduated scale between said zero marking and said full-load marking,
 e. said weight indicator means including a movably mounted carrier on which said graduated scale is disposed,
 f. setting means for manually manipulating and adjusting said scale carrier so as to set said graduated scale in different positions along the path of movement by the pointer thereby to facilitate zeroing and weight measurement of successively added loads,
 g. said adjustable scale carrier having a range of movement which is at least as great as the length, from end to end, of the graduated scale,
 h. said carrier having a range of movement sufficient to enable the zero marking to be selectively advanced from a position coincident with the zero pointer position up to a position adjacent the full-load pointer position at the upper limit of the operational range, and
 i. means frictionally controlling and restraining movement of said scale carrier.

11. The combination as defined in claim 10 wherein the scale carrier is mounted for rotation about the central axis of the housing and comprises a cylinder with the graduated scale markings extending axially as a series of parallel lines presented upon the exterior surface of said cylinder.

12. The combination as defined in claim 10 wherein the scale carrier is mounted for rotation about the central axis of the housing and comprises a frusto-conical member with the graduated scale markings directed toward the apex thereof.

13. The combination as defined in claim 10 wherein said scale carrier is mounted for rotation about the central axis of the housing and further wherein the pointer moves around a pivotal axis, and the viewing window has the shape of a segment of a circular arc with a length commensurate with the operational range of movement of the pointer.

14. The combination as defined in claim 10 wherein the setting means includes a digitally engageable grip member which projects outside said housing to facilitate manual manipulation of said scale carrier.

15. The combination as defined in claim 14 wherein said grip member projects laterally substantially in alignment with a zero marking of the graduated scale.

* * * * *